US011586805B2

(12) United States Patent
Muralidharan et al.

(10) Patent No.: US 11,586,805 B2
(45) Date of Patent: Feb. 21, 2023

(54) MACHINE-LEARNING-BASED NATURAL LANGUAGE PROCESSING TECHNIQUES FOR LOW-LATENCY DOCUMENT SUMMARIZATION

(71) Applicants: ATLASSIAN PTY LTD, Sydney (AU); ATLASSIAN, INC., San Francisco, CA (US)

(72) Inventors: Karthik Muralidharan, Bangalore (IN); Shashank Prasad Rao, Bengaluru (IN); Krishna Sai, Bangalore (IN)

(73) Assignees: ATLASSIAN PTY LTD., Sydney (AU); ATLASSIAN, INC., San Francisco, CA (US)

( * ) Notice: Subject to any disclaimer, the term of this patent is extended or adjusted under 35 U.S.C. 154(b) by 23 days.

(21) Appl. No.: 17/385,572

(22) Filed: Jul. 26, 2021

(65) Prior Publication Data
US 2023/0027310 A1    Jan. 26, 2023

(51) Int. Cl.
*G06F 40/166*    (2020.01)
*G06F 40/40*    (2020.01)
*G06F 40/284*    (2020.01)

(52) U.S. Cl.
CPC .......... *G06F 40/166* (2020.01); *G06F 40/284* (2020.01); *G06F 40/40* (2020.01)

(58) Field of Classification Search
None
See application file for complete search history.

(56) References Cited

U.S. PATENT DOCUMENTS

| | | | |
|---|---|---|---|
| 2019/0042551 A1* | 2/2019 | Hwang | G06N 3/0454 |
| 2020/0065387 A1* | 2/2020 | Matthews | G06F 3/0484 |
| 2020/0104498 A1* | 4/2020 | Smith | H04L 63/1416 |
| 2020/0159755 A1* | 5/2020 | Iida | G06N 3/0445 |
| 2021/0192126 A1* | 6/2021 | Gehrmann | G06N 20/00 |
| 2021/0286951 A1* | 9/2021 | Song | G06N 3/0454 |
| 2021/0365485 A1* | 11/2021 | Kohita | G06N 3/0454 |
| 2021/0365773 A1* | 11/2021 | Subramanian | G06N 3/0445 |

(Continued)

OTHER PUBLICATIONS

Tretyak, Vladislav, and Denis Stepanov, "Combination of abstractive and extractive approaches for summarization of long scientific texts", 2020, arXiv preprint arXiv:2006.05354. (Year: 2020).*

(Continued)

*Primary Examiner* — Ariel Mercado
(74) *Attorney, Agent, or Firm* — Alston & Bird LLP

(57) ABSTRACT

Various embodiments of the present invention provide methods, apparatuses, systems, computing devices, and/or the like that are configured to effectively and efficiently generate one or more abstractive summaries of one or more multi-section documents. For example, certain embodiments of the present invention provide methods, apparatuses, systems, computing devices, and/or the like that are configured to generate an abstractive summary of a multi-section document comprising one or more sections, by generating one or more section summaries, section input batches for each selected section, model outputs created by one or more text summarization machine learning models through the performance of a batch processing operation sequence, abstractive summaries, and then storing the abstractive summaries.

20 Claims, 12 Drawing Sheets

(56) References Cited

U.S. PATENT DOCUMENTS

2022/0215274 A1* 7/2022 Mattivi .................. G06N 20/00
2022/0269713 A1* 8/2022 Wang .................. G06F 16/4393

OTHER PUBLICATIONS

Khatri, Chandra, Gyanit Singh, and Nish Parikh, "Abstractive and extractive text summarization using document context vector and recurrent neural networks", 2018, arXiv preprint arXiv:1807.08000. (Year: 2018).*

* cited by examiner

MACHINE-LEARNING-BASED NATURAL LANGUAGE PROCESSING TECHNIQUES FOR LOW-LATENCY DOCUMENT SUMMARIZATION

BACKGROUND

Various methods, apparatuses, and systems are configured to provide techniques for generating an abstractive summary of a document. Applicant has identified many deficiencies and problems associated with existing methods, apparatuses, and systems for generating an abstractive summary of a document. Through applied effort, ingenuity, and innovation, these identified deficiencies and problems have been solved by developing solutions that are in accordance with the embodiments of the present invention, many examples of which are described in detail herein.

BRIEF SUMMARY

In general, embodiments of the present invention provide methods, apparatuses, systems, computing devices, and/or the like that are configured to effectively and efficiently generate one or more abstractive summaries of one or more multi-section documents. For example, certain embodiments of the present invention provide methods, apparatuses, systems, computing devices, and/or the like that are configured to generate an abstractive summary of a multi-section document comprising one or more sections, by generating one or more section summaries, section input batches for each selected section, model outputs created by one or more text summarization machine learning models through the performance of a batch processing operation sequence, abstractive summaries, and then storing the abstractive summaries.

In accordance with another aspect, a computer program product is provided. The computer program product may comprise at least one computer-readable storage medium having computer-readable program code portions stored therein, the computer-readable program code portions comprising executable portions configured to: for each section of the multi-section document, generate a section summary, wherein generating the section summary comprises: generating one or more section input batches for a selected section, wherein each section input batch comprises a segment of the selected section determined based on an input size limit hyper-parameter of a text summarization machine learning model, and generating the section summary for the selected section based on a model output generated by the text summarization machine learning model via performing a batch processing operation sequence for the selected section in relation to the one or more section input batches; generate the abstractive summary by aggregating each section summary for each section of the multi-section document; and store the abstractive summary in a storage location associated with the multi-section document, wherein the abstractive summary is configured to be used to generate abstractive summary user interface data for one or more document summarization user interface elements, and wherein the one or more document summarization user interface elements are collectively configured to depict, for each section of the multi-section document, a section heading for the section and the section summary for the section.

In accordance with yet another aspect, an apparatus comprising at least one processor and at least one memory including computer program code is provided. In one embodiment, the at least one memory and the computer program code may be configured to, with the processor, cause the apparatus to: for each section of the multi-section document, generate a section summary, wherein generating the section summary comprises: generating one or more section input batches for a selected section, wherein each section input batch comprises a segment of the selected section determined based on an input size limit hyper-parameter of a text summarization machine learning model, and generating the section summary for the selected section based on a model output generated by the text summarization machine learning model via performing a batch processing operation sequence for the selected section in relation to the one or more section input batches; generate the abstractive summary by aggregating each section summary for each section of the multi-section document; and store the abstractive summary in a storage location associated with the multi-section document, wherein the abstractive summary is configured to be used to generate abstractive summary user interface data for one or more document summarization user interface elements, and wherein the one or more document summarization user interface elements are collectively configured to depict, for each section of the multi-section document, a section heading for the section and the section summary for the section.

BRIEF DESCRIPTION OF THE SEVERAL VIEW OF THE DRAWINGS

Having thus described some embodiments in general terms, references will now be made to the accompanying drawings, which are not drawn to scale, and wherein:

Figure 9:
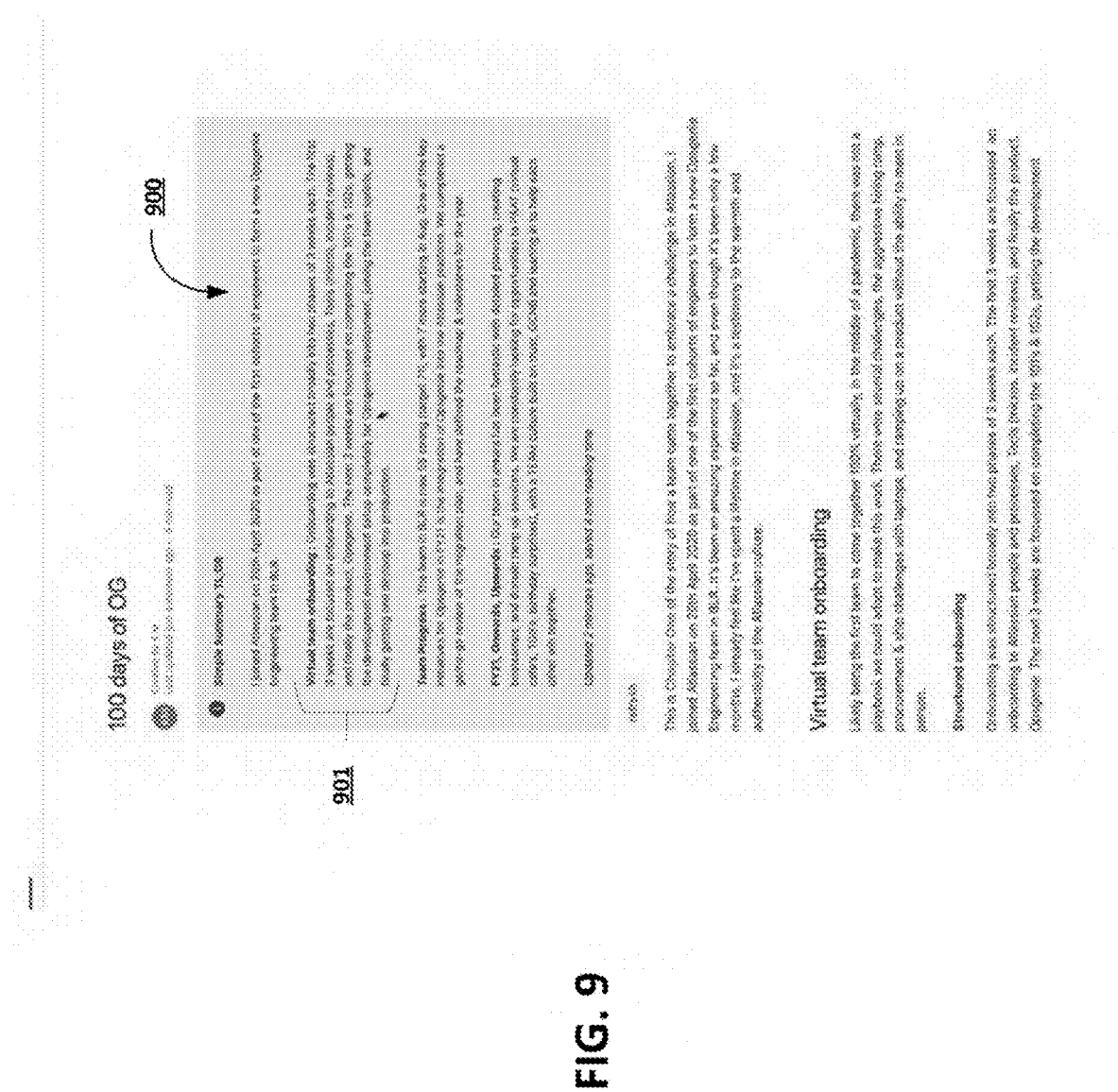
Figure 10:
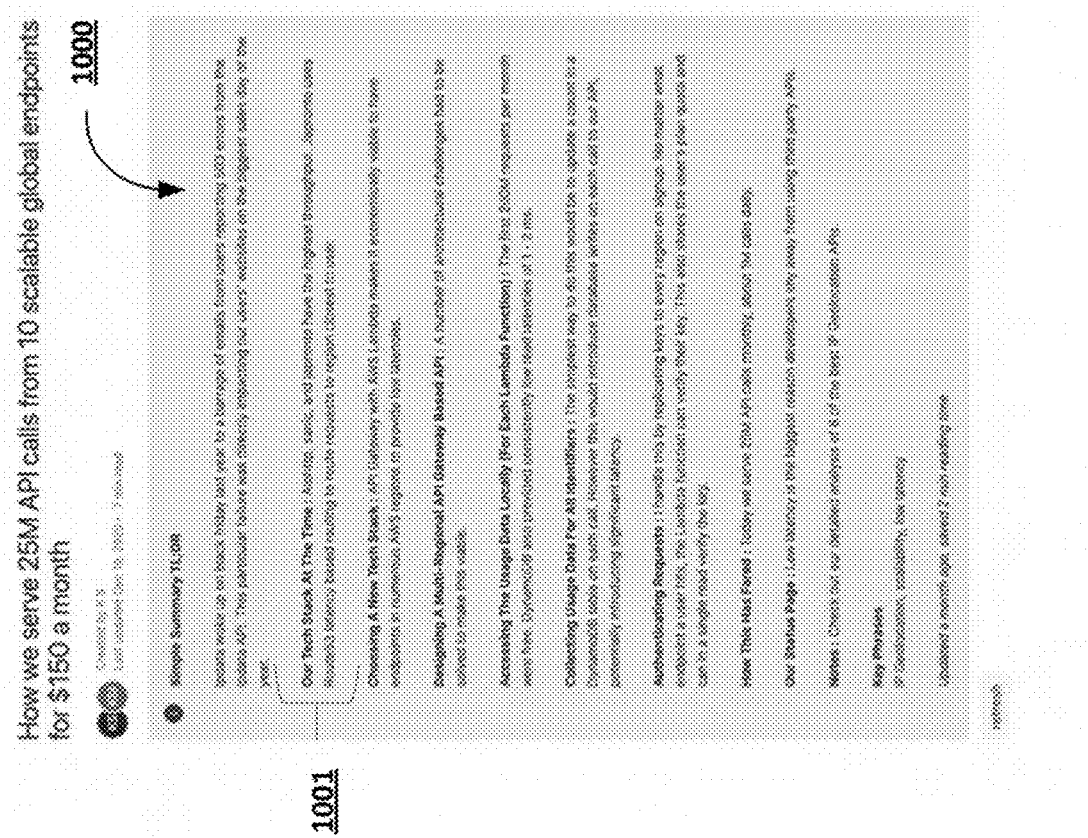

FIGS. 9-10 provide operational examples of document summarization user interface elements that describes all of the abstractive summary for a multi-section document in accordance with at least some embodiments of the present invention.

Figure 11:
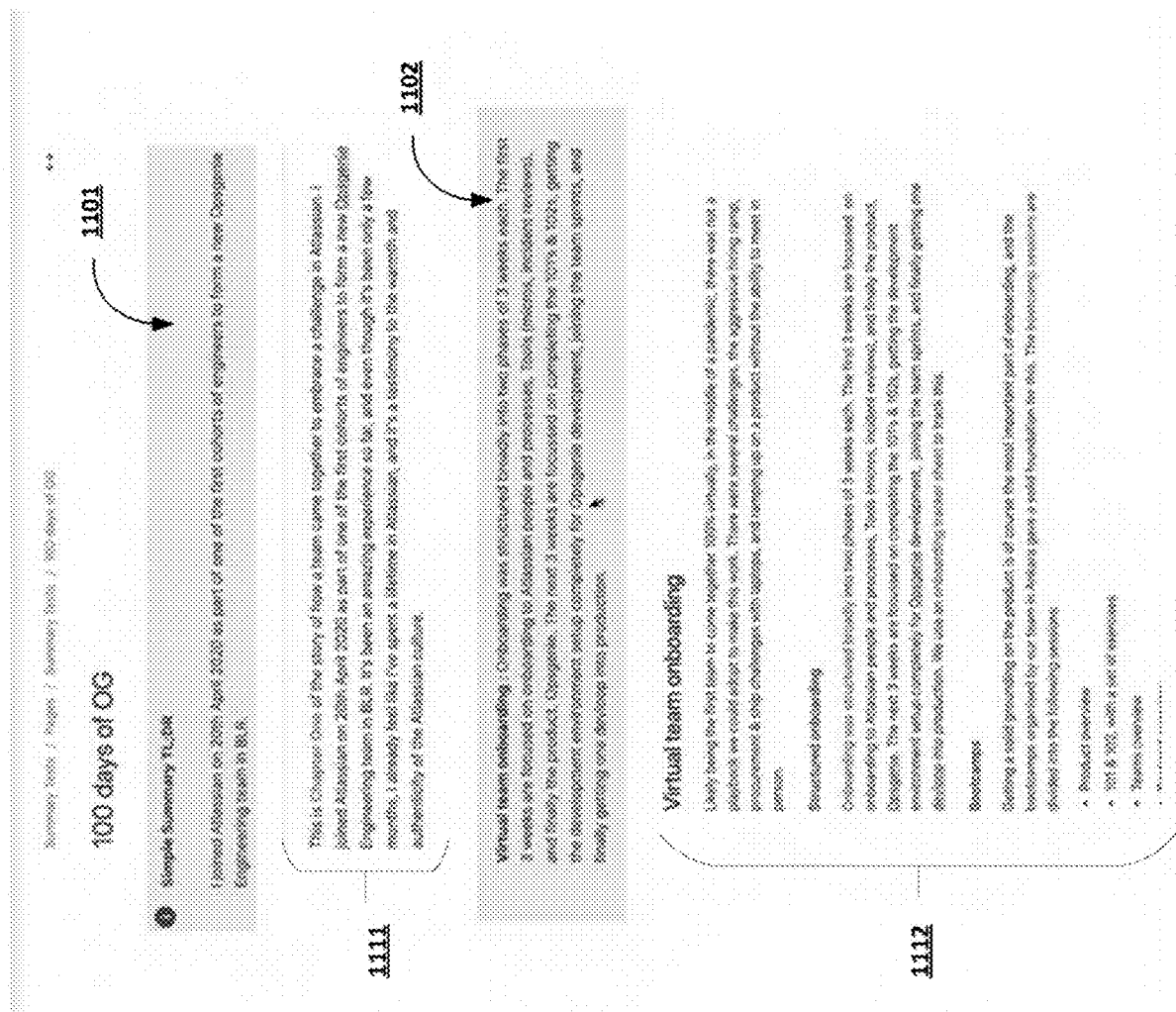

FIG. 11 provides an operational example of a set of document summarization user interface elements that each describe the section summary for a corresponding section of a multi-section document in accordance with at least some embodiments of the present invention.

Figure 12:
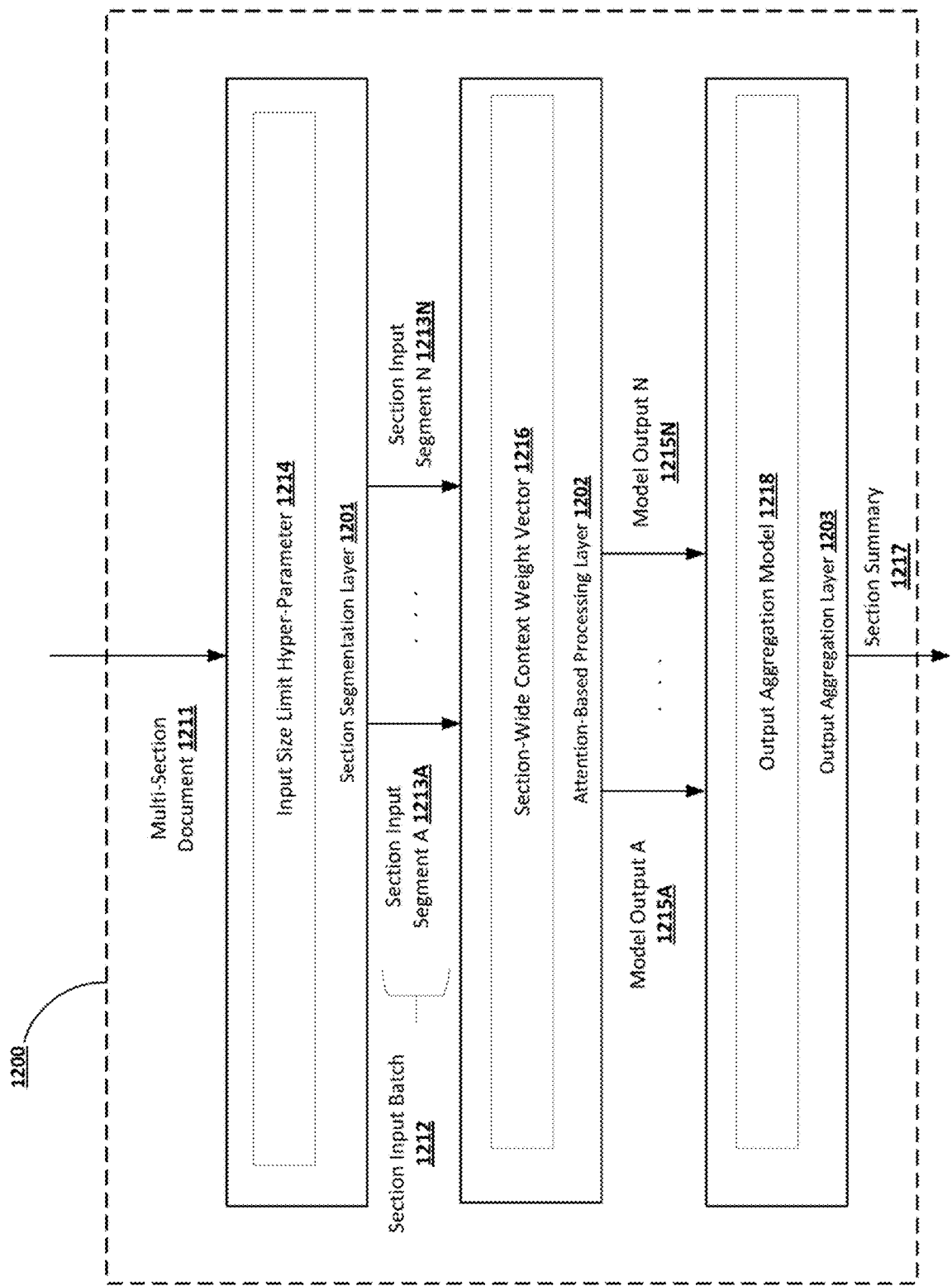

FIG. 12 provides an operational example of an attention-based transformer text summarization machine learning model in accordance with at least some embodiments of the present invention.

DETAILED DESCRIPTION OF VARIOUS EMBODIMENTS

Various embodiments of the present invention now will be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

Various embodiments of the present invention address technical problems associated with generating abstractive summaries of multi-section documents. The disclosed techniques can be utilized by a document collaboration server system to efficiently and reliably generate abstractive summaries for multi-section documents. The multi-section documents may be created by end users interacting with a document collaboration server system. In this context, an end user may seek to easily and quickly access an abstractive summary of the contents of a multi-section document. The claimed invention is configured to produce a low-latency abstractive summary of a multi-section document and thereby reduce the amount of time an end user would have to wait for other inferior systems to give an extractive summary of a similar document (e.g., on average, taking 20 seconds to process a multi-section document having 1200 words). An example of a document collaboration server system that may use the abstractive summary generation techniques disclosed herein is the Confluence® collaborative document management platform that is owned by Atlassian PTY LTD.

Document collaboration server systems often store a large number of collaborative documents that may be accessible/editable by large teams of end users. As the number of end users and collaborative documents grow at rapid scale it becomes important for the large corpus of collaborative documents to be quickly queried and any query results to be efficiently and accurately assessed.

Multi-section collaborative documents present a difficult challenge. Various segments of such multi-section collaborative documents may include content that is considered inconsistent or non-harmonious relative to other segments of such documents. Thus, extractive summarization tools that do not separately consider each segment of a multi-section document tend to produce summarized output data that is flawed and incomplete. Queries run on such summarized output data cannot hope to produce accurate low-latency results that would be useful to end users attempting to quickly navigate a huge corpus of multi-section collaborative documents.

An abstractive summary generation technique, like the one disclosed herein, can overcome the challenge posed by multi-section collaborative documents by accurately and harmoniously summarizing an entire document in a succinct manner, which can in turn reduce the confusion of the end users and consequently the number of document retrieval queries and/or document retrieval queries generated by confused end users in order to clarify questions raised by contents of non-harmonious multi-section documents. By reducing the number document retrieval queries and/or document retrieval queries transmitted to document collaboration server systems, various embodiments of the present invention reduce the operational load on document collaboration server systems.

Another technical challenge addressed by various embodiments of the present invention relates to the efficiency with which text summarization machine learning models are able to learn complexities of different types of text data. Text summarization machine learning models may be inefficient for processing particular text documents if said text documents are not parsed (or chunked) in accordance with the same hierarchical segmentation as presented in the corresponding text document. By chunking the content data from the individual documents and feeding each chunked section into the text summarization machine learning model, the text summarization machine learning model may more efficiently select certain phrase or terms to assign attention weights (and context weights), such that only after the attention weights and context weights have been assigned, will the text summarization machine learning model aggregate the weights to create a harmonious and abstractive summary of entire sections of a multi-section document. The hierarchical segmentation helps the text summarization machine learning model more accurately and efficiently use predictive insights to predict the abstractive meanings of input sections of content data from a document. A text summarization machine learning trained using the described method herein can be trained using less training than other text summarization machine learning models. Accordingly, various embodiments of the present invention improve the training efficiency of text summarization machine learning models and reduce operational load on computer systems that are configured to train text summarization machine learning models.

Various embodiments of the present invention address challenges associated with the differing sets of content data which can be found in one or more documents by providing end users with document summarization user interface elements that provide content data information using an abstractive (rather than extractive) summary, which may more closely parallel a naturally created summary. Importantly, in the noted embodiments, the abstractive summary user interfaces are designed to be automatically updated, in order to provide the most up-to-date renderings of the content data found in each document and facilitate reliable and efficient analysis of the noted content data by the end users. End users are able to quickly decide whether the document should be read more fully based on the abstractive summary, whether the end user should not read the document more fully because their specific question was answered in the abstractive summary, or whether to move on to another document's abstractive summary due to lack of the correct subject-matter found in the current document. The objective of the noted embodiments is to reduce the amount of time an end user may take to read and understand the subject matter of a document, reduce the computational time it takes for a text summarization machine learning model to create an abstractive summary from the content data of a document, and reduce the creation of less harmonious and less natural summaries created by other text summarization machine learning models that may extract certain terms and phrases from a document.

Accordingly, various embodiments of the present invention reduce the amount of time an end user may take to read and understand the subject matter of a document, reduce the computational time it takes for a text summarization machine learning model to create an abstractive summary from the content data of a document, and reduce the creation of less harmonious and less natural summaries. Moreover, various other embodiments of the present reduce the amount of time it may take for a text summarization model to create an abstractive summary user interface presented to an end user, a feature that is enabled by presenting multiple types of document summarization user interface elements.

In some embodiments, when a multi-section document is a Confluence® page, various embodiments of the present invention enable: (i) returning more relevant search results in response to page search queries based on abstractive summaries of multi-section documents, (ii) efficient recursive link and summary parsing in a page, (iii) integrating abstractive summaries into email notifications regarding page content change to facilitate user decision-making about whether to click on page links included in those email notifications, (iv) generating runbook suggestions to help new agents on steps to take to resolve support tickets, and (v) performing report analysis and summarization.

Definitions

The term "section" refers to a data object that describes a defined subset of the text and/or other media within a document. A section is defined by document content data associated with a document, where the document content data are generated by a document collaboration server computing device and stored in a storage subsystem that is associated with the document collaboration server computing device. The document content data is used to visually demarcate one or more sections of a corresponding document within a document user interface that is displayed by the client computing device to an end user of the client computing device. The section demarcation may be performed based on the use of headings, sub-headings, text, images, graphs, and the like to describe the hierarchy of the contents within the document. In some embodiments, a section may comprise a set of paragraphs associated with a heading or a sub-heading, such as all paragraphs associated with first-level headings and/or all second-level headings. In some embodiments, a section may comprise a list (e.g. bullet point or numbered list), or it may comprise a table within a document. The contents of each section are configured to be transmitted, received, and/or stored in accordance with embodiments of the present invention. The contents of each section may be configured to be transmitted between multiple computers and/or multiple servers, and such transmissions may pass through multiple relays, routers, network access points, base stations, hosts, and/or the like. Where a computing device is described herein to send content data associated with one or more sections to another computing device, it will be appreciated that the content data may be sent directly to another computing device or may be sent indirectly via one or more intermediary computing devices, such as using one or more servers, relays, routers, network access points, base stations, hosts, and/or the like.

The term "multi-section document" refers to a data object that describes a document including two or more sections as defined above. A multi-section document may be defined by document content data associated with the multi-section document, where the document content data are generated by a document collaboration server computing device and stored in a storage subsystem that is associated with the document collaboration server computing device. In some embodiments, contents of a document may be sectioned according to headings, sub-headings, text, images, graphs, and the like to describe the hierarchy of the contents within the document. In some embodiments, sections of the document may be determined based on content data associated with the document as well as segmentation guidelines for generating sections based on documents. For example, content data that is organized under first-level headings may have multiple sections corresponding with each first-level heading. The same can be true for a document comprising both first-level headings and second-level headings, where the multiple sections in a document may comprise the content data within all first-level headings, or the multiple sections in a document may correspond to all the second-level headings within each first-level heading and the multiple sections may be demarcated by said second-level headings. This hierarchy can also include segments and sections based off different formatting options. For instance, a document could split up sections by applying different font styles and typefaces to text and other media, different font sizes, different paragraph spacing, different margin sets, inputting horizontal lines to breakup text, inputting blank areas to breakup text, different text colors, different tab spacing or different indentations. Additionally, if there is a specific format for a document, such as the Atlassian® Document Format (ADF), then a multi-section document may be split up based on the hierarchical taxonomy of documents defined by the specific format.

The term "hierarchical segmentation" refers to a data object that describes one or more segments of a document based on a hierarchy of document segmentation nodes for the document as defined by document content data associated with the document. The hierarchical segmentation for a document may be defined by document metadata associated with a document, where the document metadata are generated by a document collaboration server computing device and stored in a storage subsystem that is associated with the document collaboration server computing device. For example, in some embodiments, the end user may type text data into a web-based document interface associated with the document collaboration server computing device and, after the end user has indicated that the document is ready for publication or storage, the end user may submit the document for storage to the storage subsystem associated with the document collaboration server computing device. After the data is stored in the storage subsystem, the data may be used to generate document user interfaces that display various sections of the document via visual demarcation. An example of a hierarchical segmentation is a hierarchy of nodes associated with ADF document, wherein each line of text and its corresponding chosen format are defined within the structure of the nodes. In an ADF document, there may be two different categories of nodes: block nodes and inline nodes. Block nodes denote the structural elements of the document, such as headings, paragraphs, lists, or tables, while inline nodes denote the content of those structural elements, such as text and images. Additionally, the category of inline nodes may also include text marks, which are used to control text formatting such as italics or bolding. In some embodiments, within each block node, there may be a root block node, a top-level block node, or a child block node to further describe the structure of the document. In an ADF document, the root block node is used to create every document, where each root block node comprises a version, a document type, and a content area. The top-level block nodes then further describe the structure of the content within the root block node. The child block nodes are used to further structure the content within the top-level blocks by denoting whether the contents of the top-level blocks should be a table cell, a table header, media, or a list item. Other examples of non-ADF hierarchical segmentations include a hierarchical segmentation delineating headings and sub-headings within a document and then extracting the corresponding text or images underneath each heading or sub-heading to generate a hierarchical scheme for the document based on section headings. Aspects of the ADF are described in https://developer.atlassian.com/cloud/jira/platform/apis/document/structure/.

The term "section heading" refers to a data object that describes an nth level hierarchical visual demarcation (such as a particular first-level heading, or a particular second-level heading, and/or the like) within a document, wherein the section heading may comprise a text representation of a heading node (or document segmentation node) associated with a defined section. Section headings may be defined by document content data for a corresponding document, where the document content data is generated by an end user through their interactions with the client computing device and transmitted by the client computing device to a document collaboration server computing device for storage by a storage system that is associated with the document collaboration server system. The section headings may be used to "chunk" or separate the text (or other types of content data, such as lists, bullets, or images) under the nth level heading for pre-processing.

The term "section input batch" refers to a data object that is configured to describe a batch (or group) of input tokens that are supplied as an input to a text summarization machine learning model, such as the Text-To-Text Transfer Transformer (T5) text summarization machine learning model, where each batch of tokens is extracted from within a section of a document. The section input batches are generated by a document collaboration server computing device based on processing content data (e.g., text data) associated with a corresponding. The section input batches associated with a section of a multi-section document are processed by a text summarization machine learning model to generate a section summary of the noted section. In some embodiments, text summarization machine learning models have limits for size of tokens that are provided as inputs to those models, where those limits are defined by input size limit hyper-parameters of those text summarization machine learning models. Thus, when the size of the content data corresponding to a section exceeds the input size limit hyper-parameter of a model that is used to generate a section summary for the section, then the content data may be divided into two or more section input batches that are provided to the model during one processing iteration of the corresponding text summarization machine learning model.

The term "batch processing operation sequence" refers to a data object that is configured to describe a set of processing iterations of a text summarization machine learning model that are performed to generate a section summary for a corresponding section of the multi-section document. The batch processing operation sequence comprises one or more batch processing operations, where each batch processing operation describes a processing iteration of the text summarization machine learning model in relation to the corresponding section and includes processing a section input batch associated with the batch processing operation using the text summarization machine learning model in order to generate a model output for the corresponding section. The batch processing operation sequence is generated by the document collaboration server computing device as configuration data for an inference performed by the text summarization machine learning model. In some embodiments, given a set of section ordered input batches whose ordering is determined based on the ordering of the corresponding segments of a selected section, the ordering of the batch processing operations in the batch processing operation sequence for the selected section is determined based on the ordering of the segments of the multi-section document. For instance, if the segment X comes before the segment Y within a selected section, then the batch processing operations sequence will perform the batch processing operation for the segment X before the processing operation for the segment Y. In some embodiments, the order of the batch processing operation sequence may be based on ordering criteria defined by prior configuration data for the multi-section document, prior configuration data for the text summarization machine learning model, and/or configuration data provided by an end user of the document collaboration server computing device.

The term "input size limit hyper-parameter" refers to a data object that is configured to describe the input token limit of a text summarization machine learning model. The input size limit hyper-parameter is stored as part of the configuration data for a corresponding text summarization machine learning model on a storage subsystem associated with a document collaboration server computing device. For example, in some embodiments, the input size limit hyper-parameter for the T5 text summarization machine learning model is 512, such that the T5 text summarization machine learning model may during each processing iteration only process an input text having a size up to 512 tokens. As another example, in some embodiments, the input size limit hyper-parameter for a first variant of the pre-training with extracted gap-sentences (Pegasus) text summarization machine learning model is 512, such that the first variant of the Pegasus text summarization machine learning model may during each processing iteration only process an input text having a size up to 512 tokens. As yet another example, in some embodiments, the input size limit hyper-parameter for a second variant of the Pegasus text summarization machine learning model is 1024, such that the second variant of the Pegasus text summarization machine learning model may during each processing iteration only process an input text having a size up to 1024 tokens. As a further example, in some embodiments, the input size limit hyper-parameter for a third variant of the Pegasus text summarization machine learning model is 2048, such that the third variant of the Pegasus text summarization machine learning model may during each processing iteration only process an input text having a size up to 2048 tokens. The input size limit hyper-parameter of a text summarization machine learning model may be used to generate segments of a section and generate section input batches for the section based on the generated segments of the section. For example, if the text summarization machine learning model is a T5 which has an input size limit hyper-parameter of 512 tokens, and if a particular section comprises 1,000 tokens, then the first segment of that section may include the first 512 tokens of the section and the second segment of the section may include the last 488 tokens of the section. In this example, if the first 512 tokens of the section precede the second 488 tokens of the section, then the section input batch corresponding to the first 512 tokens are processed by the same text summarization machine learning model before the section input batch corresponding to the last 488 tokens.

The term "text summarization machine learning model" refers to a data object that is configured to describe parameters, hyper-parameters, and/or defined operations of a machine learning model that is configured to process a text input (e.g., a text input corresponding to a section input batch) in order to generate an abstractive summary (as opposed to an extractive summary) of the text input. The configuration data for a corresponding text summarization machine learning model is stored on a storage subsystem associated with a document collaboration server computing device. Examples of text summarization machine learning models include a T5 text summarization machine and one or more variants of a Pegasus text summarization machine learning model.

The term "attention-based transformer text summarization machine learning model" refers to a text summarization machine learning model that utilizes an attention-based mechanism to infer the context of a particular token in the text input of the text summarization machine learning in relation to other tokens of the text summarization machine learning model. The attention-based mechanism of an attention-based transformer text summarization machine learning model may be a trained attention-based mechanism. The attention-based mechanism of an attention-based mechanism machine learning model is stored as part of the configuration data for a corresponding text summarization machine learning model on a storage subsystem associated with a document collaboration server computing device. Examples of attention-based transformer text summarization machine learning models include the T5 text summarization machine learning model and the Pegasus text summarization machine learning model.

In some embodiments, the T5 text summarization machine learning model includes an encoder and decoder which can collectively be trained on a multi-task mixture of unsupervised and supervised problems like summarization, text classification, and question and answering. The T5 text summarization model generates an abstractive summary (or paraphrased summary) instead of an extractive summary in order to create a more natural-sounding summary that may mimic the human language. In some embodiments, this transfer learning text-to-text transformer may only be able to read and summarize up to 512 tokens, or characters, at one time before a summary is created. In the T5 text summarization model, every batch of tokens for the transfer learning text-to-text transformer is saved as an input within each section of inputs (within each top-level heading or sub-heading) no matter the length of tokens. Each of the batches within the token-limit of the transfer learning text-to-text transformer may then be stored on an individual vector within the dataset, and upon completion of inputting the tokens within each top-level heading or sub-heading, the vectors may converge to create a more harmonious and abstract summary.

In some embodiments, the Pegasus text summarization model may be used as a transformer encoder-decoder model to create an abstract summary when presented with each input. In some of the noted embodiments, the transformer encoder-decoder model learns through a pre-training self-supervised objective where several sentences are removed from documents and the transformer encoder-decoder is trained to reconstruct the sentences based on the token-removed sentences. Through this exercise, the transformer encoder-decoder learns about linguistic patterns of training input data to better mimic natural language.

The term "context weight vector" refers to a data object that is configured to describe, for each token of a multi-token input, a set of attention weights for the token with respect to other tokens of the multi-token input. The context weight vector is a trained vector that is stored as part of the configuration data for a corresponding text summarization machine learning model on a storage subsystem associated with a document collaboration server computing device. In some embodiments, the context weight vector for a token of a multi-token input describes a set of soft attention weights for the token with respect to other tokens of the multi-token input. In some embodiments, the context weight vector for a token of a multi-token input describes a set of hard attention weights for the token with respect to other tokens of the multi-token input. In some embodiments, context weight vectors of a text summarization machine learning model are generated using a training routine that processes topics, content types (e.g., bullet list, tabular data, paragraphs, and/or the like), terminologies (e.g., customer-specific), and writing patterns of a corpus of multi-section documents (e.g., the entire corpus of multi-section documents on Confluence® or a corpus of multi-section documents on Confluence® that are associated with one or more target customer profiles).

The term "section summary" refers to a data object that is configured to describe the summary generated for a corresponding section by a document summarization machine learning model. Section summaries are generated by a document collaboration server computing device and transmitted as part of document summarization user interface data by the document collaboration server computing device to one or more client computing devices for presentation to end users. The section summary may be generated based on one or more section outputs generated by the text summarization machine learning model. In some embodiments, a section summary is stored on the storage subsystem of the document collaboration server computing device. The section summary may be split up by each section heading in the original document, or the section summary may only include bullet point summaries of the document contents and datasets without separate nth-level headings (i.e. first-level headings, second-level headings, and the like). The section summary may also comprise sentence summaries of the document contents and datasets with separate nth-level headings or without separate nth-level headings.

The terms "abstractive summary" refers to a data object that is configured a summary of a multi-section document that is generated based on an inferred paraphrasing of each section of the various sections of the multi-section document. An abstractive summary is generated by a document collaboration server computing device and used to generate an abstractive summary user interface data, where the abstractive summary user interface data are transmitted to the client computing device by the document collaboration server computing device and used by the client computing device to generate a set of document summarization user interface elements that are configured to be presented to an end user of the client computing device. The text, contents, data, and other media within each abstractive summary may be capable of being transmitted, received, and/or stored in accordance with embodiments of the present invention. For instance, various embodiments of the present invention describes storing the abstract summary for automatic retrieval when an end user tries to access the web document for which the abstract summary was extracted, parsed, and processed by the summary system of the present invention.

The term "document summarization user interface element" refer to a user interface element that is generated by a client computing device and generated to an end user of the client computing device. The document summarization user interface element is generated by the client computing device based on abstractive summary user interface data generated by a document collaboration server computing device and transmitted to the client computing device by the document collaboration server computing device. The document summarization user interface element depicts at least a portion of the abstractive summary for a multi-section document. In some embodiments, one or more document summarization user interface elements comprise a single document summarization user interface element that describes all of the abstractive summary for a multi-section document; while in other embodiments of the present invention, one or more document summarization user interface elements comprises an document summarization user interface element for each section of a multi-section document that describes the section summary for the corresponding section.

Example System Architecture

Methods, apparatuses, and computer program products of the present invention may be embodied by any of a variety of devices. For example, the method, apparatus, and computer program product of an example embodiment may be embodied by a networked device (e.g., an enterprise platform), such as a server or other network entity, configured to communicate with one or more devices, such as one or more query-initiating computing devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

Figure 1:
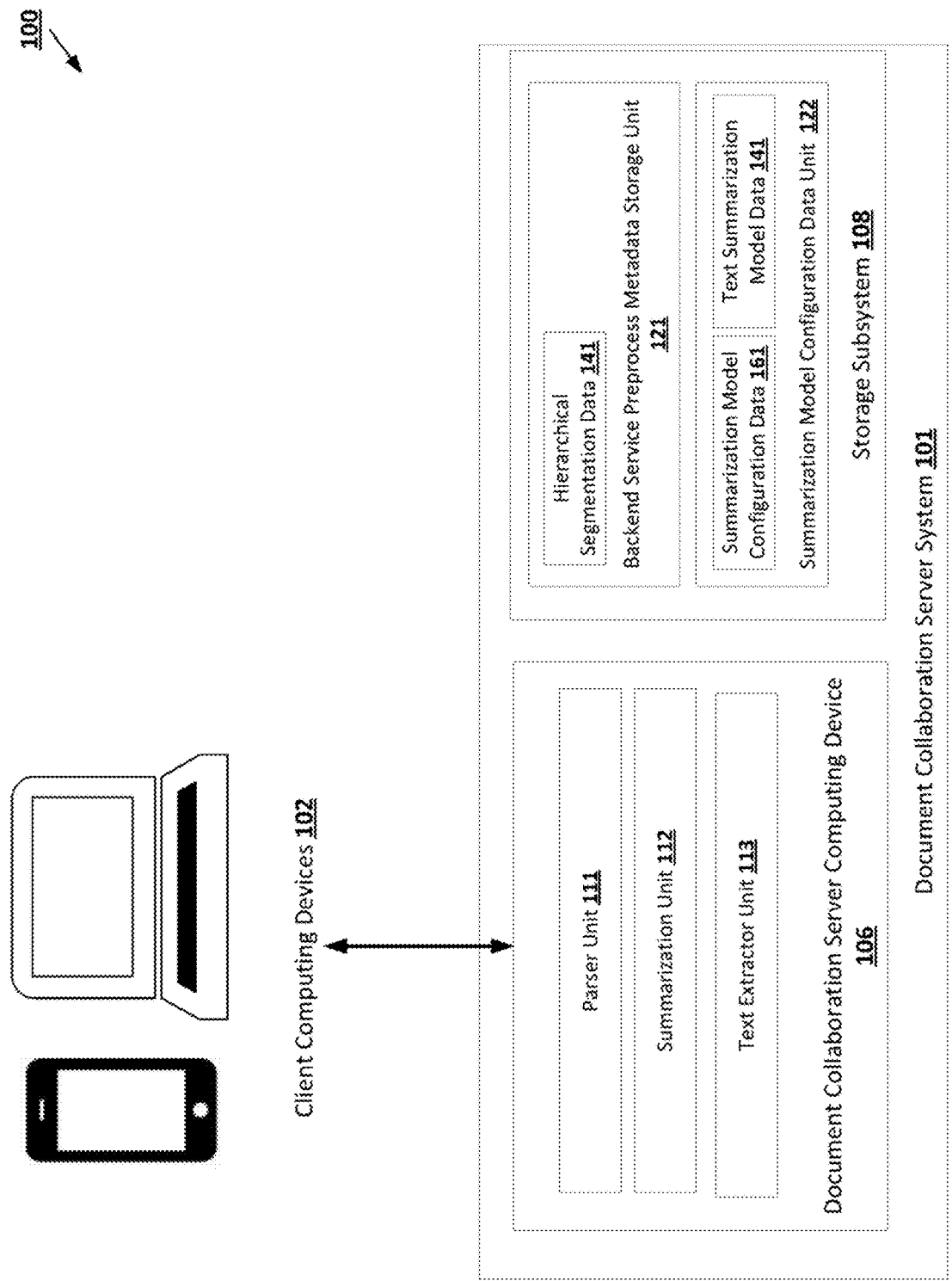
FIG. 1 is a block diagram of an example abstractive summary document collaboration server system architecture within which at least some embodiments of the present invention may operate.

FIG. 1 depicts an exemplary architecture 100 for generating an abstractive summary user interface data. The architecture 100 includes one or more client computing devices and a document collaboration server system 101. The document collaboration server system 101 is configured to store collaborative documents in a storage subsystem 108, provide the collaborative documents in response to user queries transmitted by the client computing devices 102, generate dynamically updatable document collaboration graph-based interfaces using the document collaboration server computing device 106, and provide generate abstractive summary user interface data to client computing devices 102 in response to user requests for the noted abstractive summary user interface data as transmitted by the client computing device.

The storage subsystem 108 of the document collaboration server system 101 is configured to store document content data in a backend service preprocess content data storage unit 121 that comprises content data for multi-section documents and summarization model configuration data unit 122 for the text summarization machine learning model used to perform document summarization.

In some embodiments, the backend service preprocess content data storage unit 121 comprises hierarchical segmentation data 141. The hierarchical segmentation data 141 include a hierarchical segmentation for each multi-section document of a set of multi-section documents. The hierarchical segmentation for a document may be defined by document metadata associated with a document, where the document metadata are generated by a document collaboration server computing device and stored in a storage subsystem that is associated with the document collaboration server computing device. For example, in some embodiments, the end user may type text data into a web-based document interface associated with the document collaboration server computing device and, after the end user has indicated that the document is ready for publication or storage, the end user may submit the document for storage to the storage subsystem associated with the document collaboration server computing device. After the data is stored in the storage subsystem, the data may be used to generate document user interfaces that display various sections of the document via visual demarcation. An example of a hierarchical segmentation is a hierarchy of nodes associated with ADF document, wherein each line of text and its corresponding chosen format are defined within the structure of the nodes. In an ADF document, there may be two different categories of nodes: block nodes and inline nodes. Block nodes denote the structural elements of the document, such as headings, paragraphs, lists, or tables, while inline nodes denote the content of those structural elements, such as text and images. Additionally, the category of inline nodes may also include text marks, which are used to control text formatting such as italics or bolding. In some embodiments, within each block node, there may be a root block node, a top-level block node, or a child block node to further describe the structure of the document. In an ADF document, the root block node is used to create every document, where each root block node comprises a version, a document type, and a content area. The top-level block nodes then further describe the structure of the content within the root block node. The child block nodes are used to further structure the content within the top-level blocks by denoting whether the contents of the top-level blocks should be a table cell, a table header, media, or a list item. Other examples of non-ADF hierarchical segmentations include a hierarchical segmentation delineating headings and sub-headings within a document and then extracting the corresponding text or images underneath each heading or sub-heading to generate a hierarchical scheme for the document based on section headings. Aspects of the ADF are described in https://developer.atlassian.com/cloud/jira/platform/apis/document/structure/.

In some embodiments, the summarization model configuration data unit 122 includes section model data 161 and text summarization model data 162. The section model data 161 include configuration data for a model that is configured to process a document to identify a set of sections of the document. In some embodiments, a document section is defined by document content data associated with a document, where the document content data are generated by a document collaboration server computing device and stored in a storage subsystem that is associated with the document collaboration server computing device. The document content data is used to visually demarcate one or more sections of a corresponding document within a document user interface that is displayed by the client computing device to an end user of the client computing device. The section demarcation may be performed based on the use of headings, sub-headings, text, images, graphs, and the like to describe the hierarchy of the contents within the document. In some embodiments, a section may comprise a set of paragraphs associated with a heading or a sub-heading, such as all paragraphs associated with first-level headings and/or all second-level headings. In some embodiments, a section may comprise a list (e.g. bullet point or numbered list), or it may comprise a table within a document. The contents of each section are configured to be transmitted, received, and/or stored in accordance with embodiments of the present invention. The contents of each section may be configured to be transmitted between multiple computers and/or multiple servers, and such transmissions may pass through multiple relays, routers, network access points, base stations, hosts, and/or the like. Where a computing device is described herein to send content data associated with one or more sections to another computing device, it will be appreciated that the content data may be sent directly to another computing device or may be sent indirectly via one or more intermediary computing devices, such as using one or more servers, relays, routers, network access points, base stations, hosts, and/or the like.

The text summarization model data 162 include parameters, hyper-parameters, and/or defined operations of a machine learning model that is configured to process a text input (e.g., a text input corresponding to a section input batch) in order to generate an abstractive summary (as opposed to an extractive summary) of the text input. The configuration data for a corresponding text summarization machine learning model is stored on a storage subsystem associated with a document collaboration server computing device. Examples of text summarization machine learning models include a T5 text summarization machine and one or more variants of a Pegasus text summarization machine learning model.

The document collaboration server computing device 106 of the document collaboration server system 101 includes a text extractor unit 113 that is configured to extract document content data from a multi-section document; a parser unit 111 that is configured to break up, or chunk, the content data into smaller portions, or chunks; and a summarization unit 112 that is configured to generate an abstractive summary of the content data extracted from the multi-section document.

The client computing devices 102 and the document collaboration server computing device 106 may communicate over one or more networks. A network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, a network may include a cellular telephone, an 802.11, 802.16, 802.20, and/or WiMax network. Further, a network may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. For instance, the networking protocol may be customized to suit the needs of the page management system. In some embodiments, the protocol is a custom protocol of JavaScript Object Notation (JSON) objects sent via a Web Socket channel. In some embodiments, the protocol is JSON over RPC, JSON over REST/HTTP, and the like.

Exemplary Document Collaboration Server Computing Device

Figure 2:
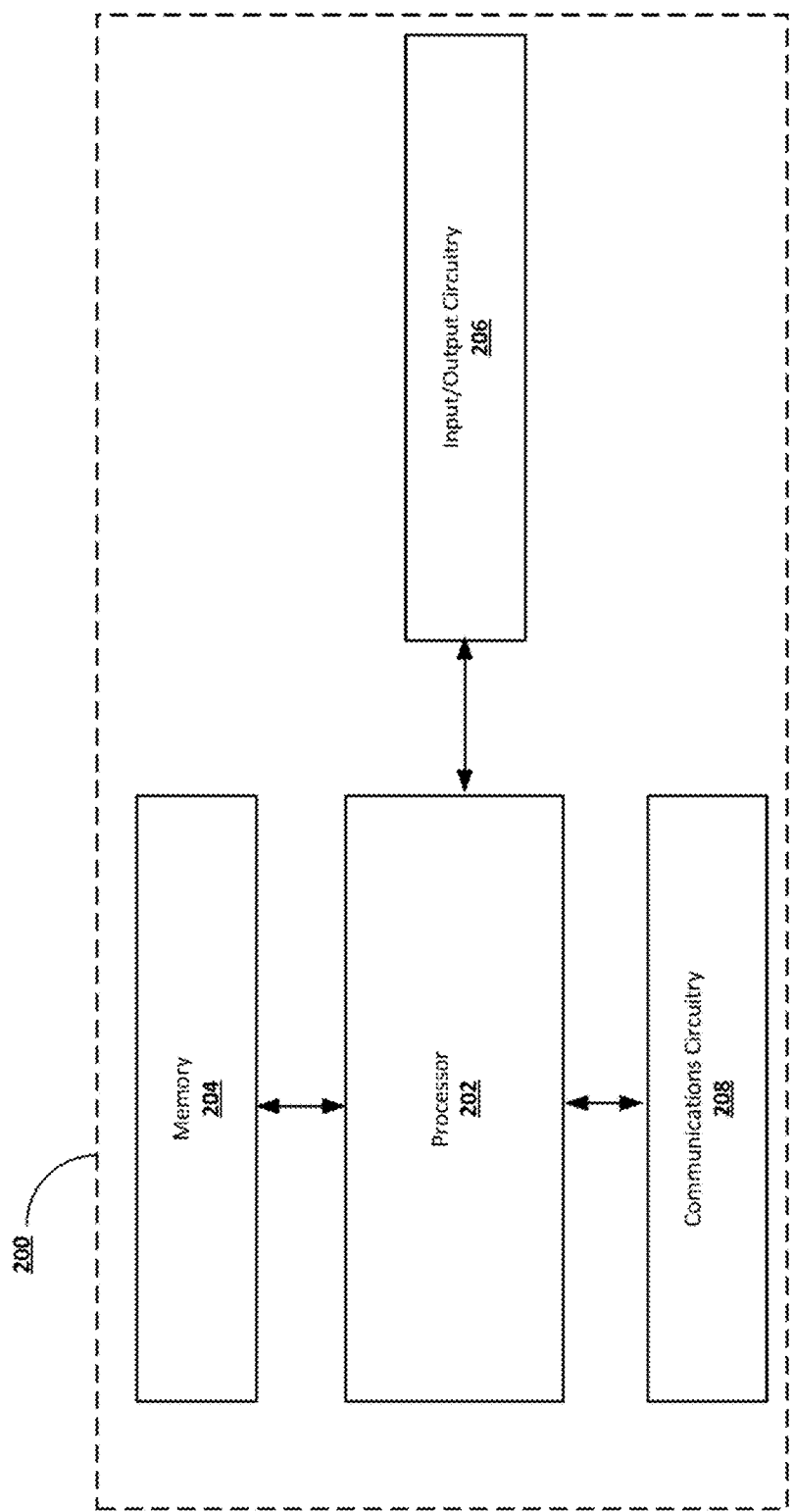
FIG. 2 is a block diagram of an example document collaboration server computing device structured in accordance with at least some embodiments of the present invention.

The document collaboration server computing device 106 may be embodied by one or more computing systems, such as apparatus 200 shown in FIG. 2. The apparatus 200 may include processor 202, memory 204, input/output circuitry 206, and communications circuitry 208. The apparatus 200 may be configured to execute the operations described herein. Although these components 202-208 are described with respect to functional limitations, it should be understood that the particular implementations necessarily include the use of particular hardware. It should also be understood that certain of these components 202-208 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a query-initiating computing device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally, or alternatively, the communications circuitry 208 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Exemplary Client Computing Device

Figure 3:
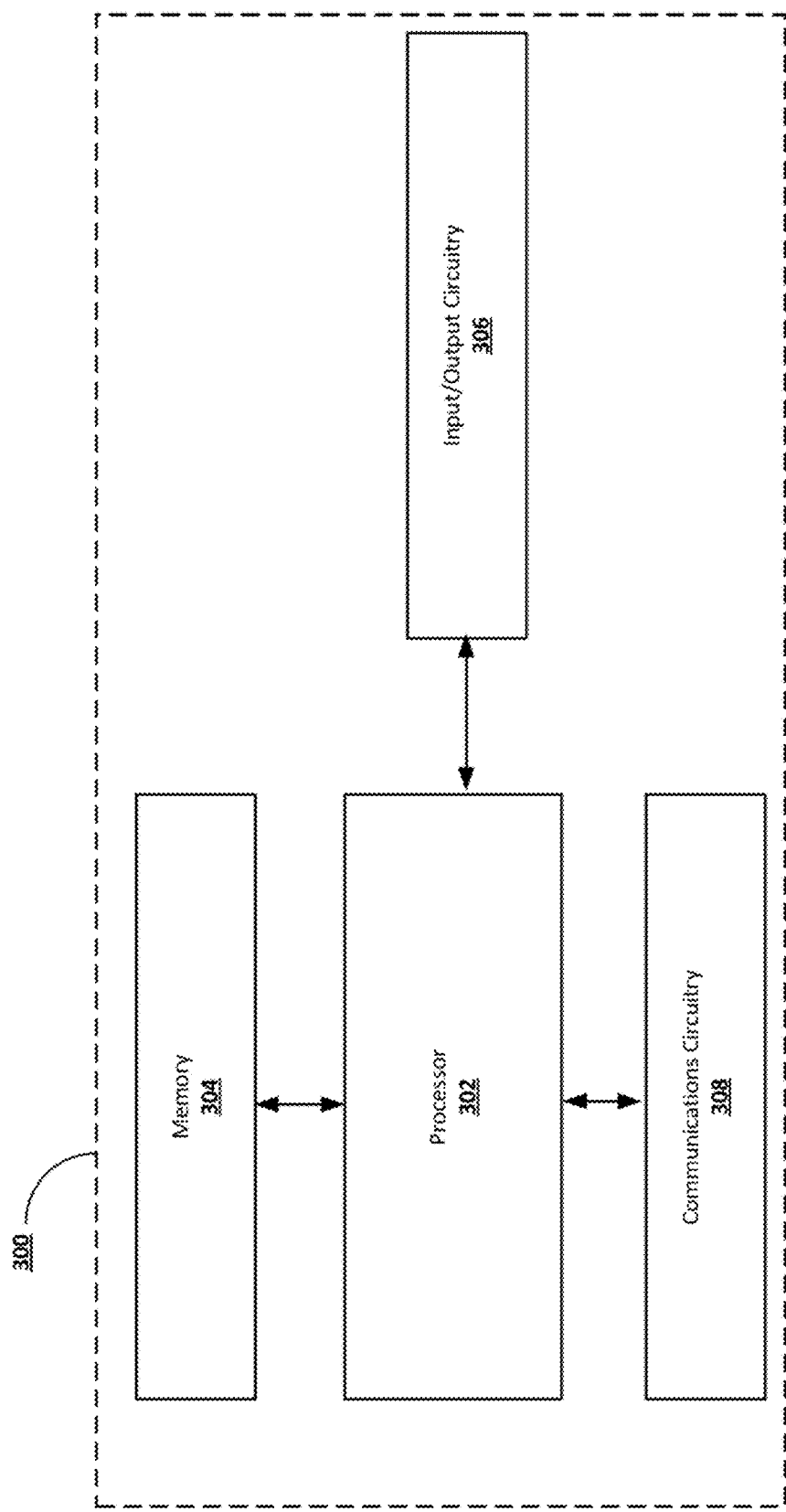
FIG. 3 is a block diagram of an example client computing device structured in accordance with at least some embodiments of the present invention.

Referring now to FIG. 3, a client computing device may be embodied by one or more computing systems, such as apparatus 300 shown in FIG. 3. The apparatus 300 may include processor 302, memory 304, input/output circuitry 306, and a communications circuitry 308. Although these components 302-308 are described with respect to functional limitations, it should be understood that the particular implementations necessarily include the use of particular hardware. It should also be understood that certain of these components 302-308 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may include one or more databases. Furthermore, the memory 304 may be configured to store information, data, content, applications, instructions, or the like for enabling the apparatus 300 to carry out various functions in accordance with example embodiments of the present invention.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions (e.g., computer program instructions), the instructions may specifically configure the processor 302 to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display, and may comprise a web user interface, a mobile application, a query-initiating computing device, a kiosk, or the like.

In embodiments in which the apparatus 300 is embodied by a limited interaction device, the input/output circuitry 306 includes a touch screen and does not include, or at least does not operatively engage (i.e., when configured in a table mode), other input accessories such as tactile keyboards, track pads, mice, etc. In other embodiments in which the apparatus is embodied by a non-limited interaction device, the input/output circuitry 306 may include may include at least one of a tactile keyboard (e.g., also referred to herein as keypad), a mouse, a joystick, a touch screen, touch areas, soft keys, and other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally, or alternatively, the communications circuitry 308 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Example Data Flows and Operations

Provided below are techniques for generating an abstractive summary of a multi-section document in a client-server architecture. However, a person of ordinary skill in the relevant technology will recognize that the disclosed techniques can be used to generate an abstractive summary of a multi-section document in other software architectures, such as in peer-to-peer software architectures. Furthermore, a person of ordinary skill in the relevant technology will recognize that the client-side operations discussed below can be performed without the server-side operations described below and vice versa.

In some embodiments, a multi-section document is a document including two or more sections as defined above. A multi-section document may be defined by document content data associated with the multi-section document, where the document content data are generated by a document collaboration server computing device and stored in a storage subsystem that is associated with the document collaboration server computing device. In some embodiments, contents of a document may be sectioned according to headings, sub-headings, text, images, graphs, and the like to describe the hierarchy of the contents within the document. In some embodiments, sections of the document may be determined based on content data associated with the document as well as segmentation guidelines for generating sections based on documents. For example, content data that is organized under first-level headings may have multiple sections corresponding with each first-level heading. The same can be true for a document comprising both first-level headings and second-level headings, where the multiple sections in a document may comprise the content data within all first-level headings, or the multiple sections in a document may correspond to all the second-level headings within each first-level heading and the multiple sections may be demarcated by said second-level headings. This hierarchy can also include segments and sections based off different formatting options. For instance, a document could split up sections by applying different font styles and typefaces to text and other media, different font sizes, different paragraph spacing, different margin sets, inputting horizontal lines to breakup text, inputting blank areas to breakup text, different text colors, different tab spacing or different indentations. Additionally, if there is a specific format for a document, such as the Atlassian® Document Format (ADF), then a multi-section document may be split up based on the hierarchical taxonomy of documents defined by the specific format.

A section of the multi-section document may be a defined subset of the text and/or other media within a document. A section is defined by document content data associated with a document, where the document content data are generated by a document collaboration server computing device and stored in a storage subsystem that is associated with the document collaboration server computing device. The document content data is used to visually demarcate one or more sections of a corresponding document within a document user interface that is displayed by the client computing device to an end user of the client computing device. The section demarcation may be performed based on the use of headings, sub-headings, text, images, graphs, and the like to describe the hierarchy of the contents within the document. In some embodiments, a section may comprise a set of paragraphs associated with a heading or a sub-heading, such as all paragraphs associated with first-level headings and/or all second-level headings. In some embodiments, a section may comprise a list (e.g. bullet point or numbered list), or it may comprise a table within a document. The contents of each section are configured to be transmitted, received, and/or stored in accordance with embodiments of the present invention. The contents of each section may be configured to be transmitted between multiple computers and/or multiple servers, and such transmissions may pass through multiple relays, routers, network access points, base stations, hosts, and/or the like. Where a computing device is described herein to send content data associated with one or more sections to another computing device, it will be appreciated that the content data may be sent directly to another computing device or may be sent indirectly via one or more intermediary computing devices, such as using one or more servers, relays, routers, network access points, base stations, hosts, and/or the like.

Exemplary Server-Side Operations

Figure 4:
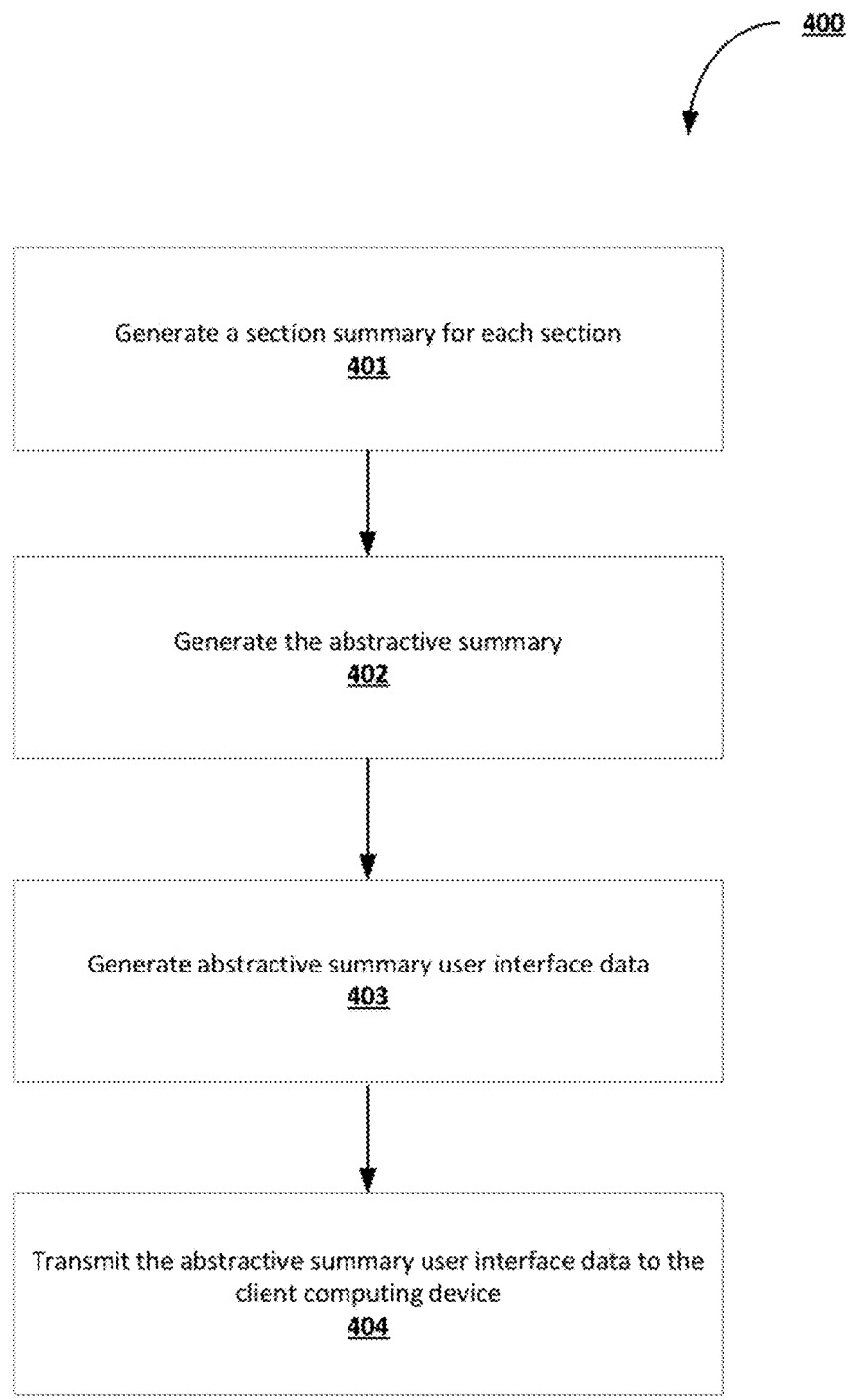
FIG. 4 is a flowchart diagram of an example process for performing server-side operations that are configured to generate abstractive summary user interface data for a multi-section in accordance with at least some embodiments of the present invention.

FIG. 4 is a flowchart diagram of an example process 400 for performing server-side operations that are configured to transmit abstractive summary user interface data for a multi-section document to a client computing device 102. Via the various operations of the process 400, the document collaboration server computing device 106 can generate abstractive summary user interface data that are in turn transmitted to the client computing device 102 for presentation of one or more document summarization user interface elements to an end user of the client computing device 102.

The process 400 begins at operation 401 when the document collaboration server computing device 106 generates a section summary for each section of a multi-section document. The section summary for each section of a multi-section document may describe an abstractive (or paraphrased) summary rather than an extractive summary for the section within the multi-section document. In some embodiments, generating each section summary for a multi-section document includes generating section input batches for each section of the multi-section document, determining a batch processing operation sequence for each section based on the section input batches for the section, and performing operations corresponding to the batch processing operation sequence for each section using a text summarization machine learning model to generate the section summary for the section based on model outputs generated by the batch processing operation sequence.

Figure 5:
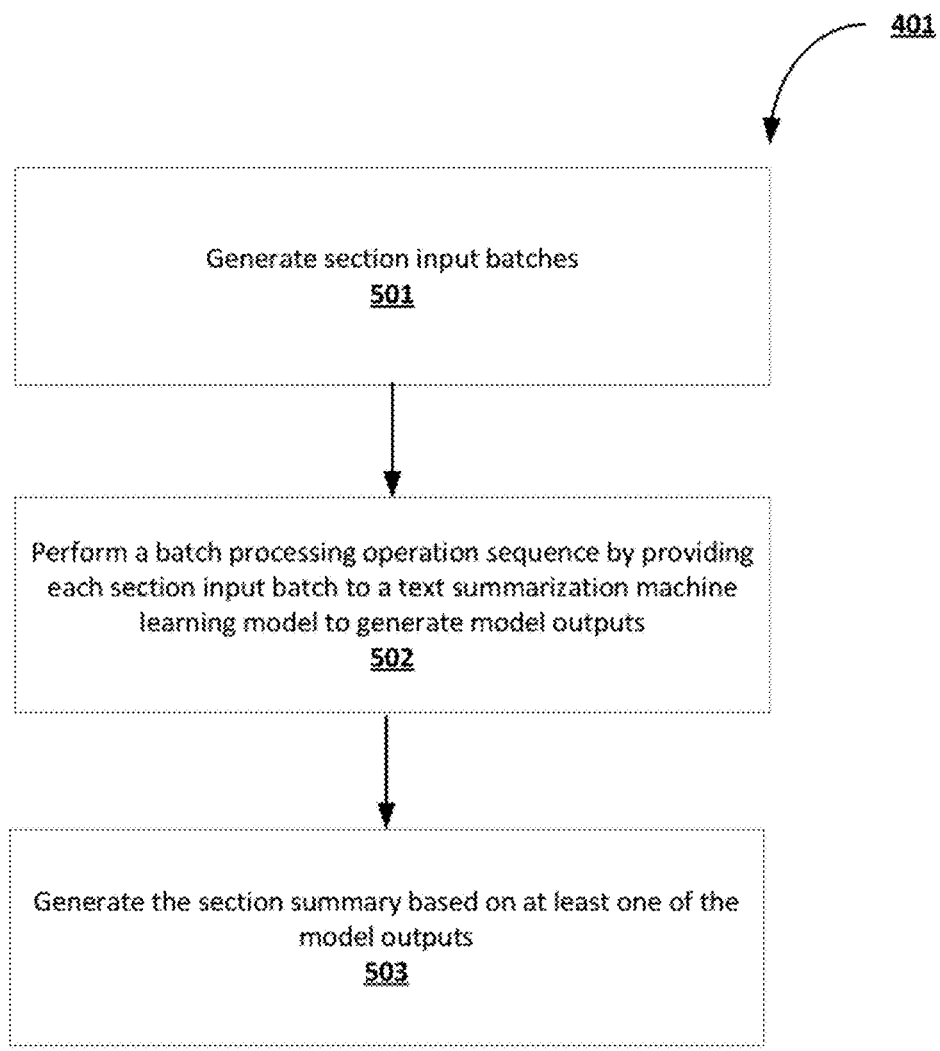
FIG. 5 is a flowchart diagram of an example process for generating a section summary for a selected section of a multi-section document in accordance with at least some embodiments of the present invention.

In some embodiments, operation 401 may be performed with respect to a particular section of the multi-section document in accordance with the process that is depicted in FIG. 5. The process that is depicted in FIG. 5 begins at operation 501 when the document collaboration server computing device 106 generates section input batches for particular section. In some embodiments, the document collaboration server computing device 106 first retrieves the multi-section document from the storage subsystem 108. In some embodiments, the content data of the multi-section document is then extracted using the text extractor unit 113 and parsed into sections using the parser unit 111. Once sections are generated, they are chunked according to an input size limit hyper-parameter of a text summarization machine learning model in order to generate the section input batches.

A section input batch may be a batch (or group) of input tokens that are provided as an input to a text summarization machine learning model, such as the Text-To-Text Transfer Transformer (T5) model, wherein each batch of tokens is extracted from within a section of a document. The section input batches may be generated by a document collaboration server computing device based on processing content data (e.g., text data) associated with a corresponding. The section input batches associated with a section of a multi-section document may be processed by a text summarization machine learning model to generate a section summary of the noted section. The section input batches of a section may be limited by the size-qualifying subset threshold. In some embodiments, machine learning models have limits for size of tokens that are provided as inputs to those models, where those limits are defined by input size limit hyper-parameters of those models. Thus, when the size of the content data corresponding to a section exceeds the input size limit hyper-parameter of a model that is used to generate a section summary for the section, then the content data may be divided into two or more section input batches that are provided to the model during one processing iteration.

For example, if a particular section includes 1000 tokens, and if the input size limit hyper-parameter equals 100 tokens, then the generated section input batches may include ten section input batches each comprising a disjoint subset of 1000 tokens having 100 tokens. As another example, if a particular section includes 990 tokens, and if the input size limit hyper-parameter equals 100 tokens, then the generated section input batches may include nine section input batches each comprising a disjoint subset of 1000 tokens having 100 tokens, as well as one section input batch comprising a disjoint subset of 90 tokens.

Figure 7:
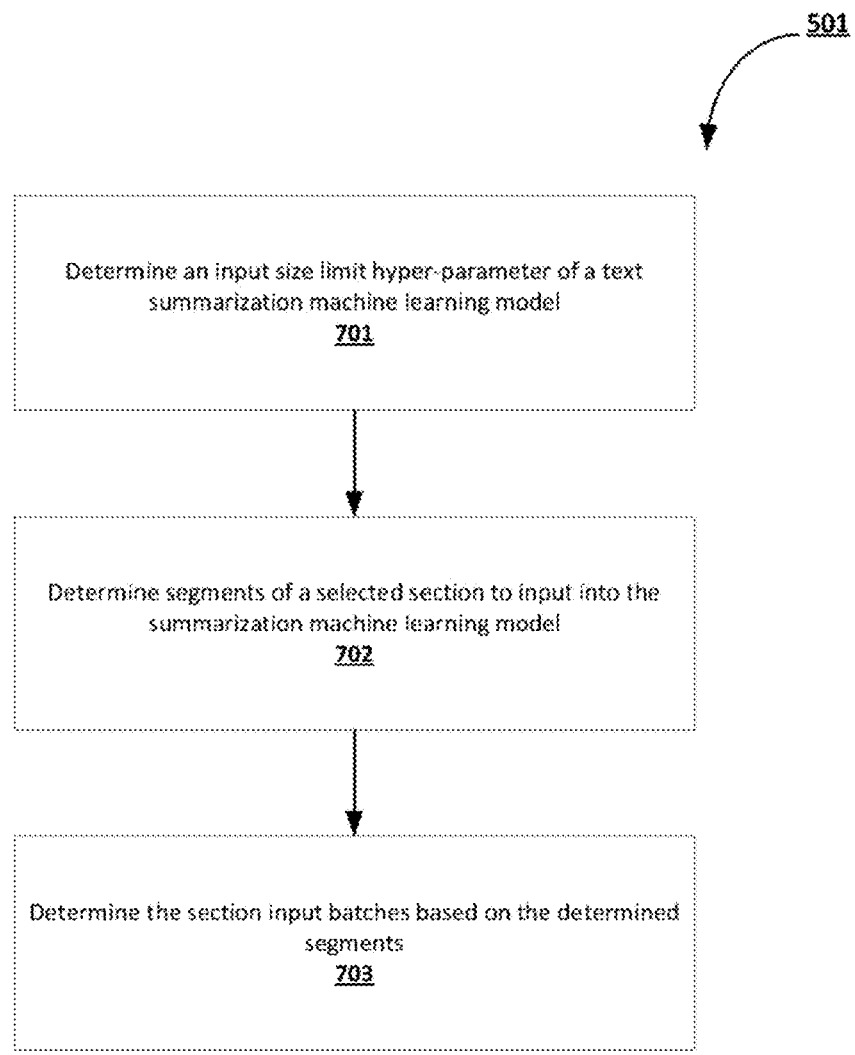
FIG. 7 is a flowchart diagram of an example process for generating section input batches for a selected section of a multi-section document in accordance with at least some embodiments of the present invention.

In some embodiments, operation 501 may be performed in accordance with the process that is depicted in FIG. 7. The process that is depicted in FIG. 7 begins at operation 701 when the document collaboration server computing device 106 determines the input size limit hyper-parameter of the text summarization machine learning model. As mentioned in part above, the input size limit hyper-parameter may describe the input token limit of the text summarization machine learning model. For example, for the T5 text summarization machine learning model, this input token limit is 512 tokens.

In some embodiments, the input size limit hyper-parameter is an input token limit of a text summarization machine learning model. The input size limit hyper-parameter may be stored as part of the configuration data for a corresponding text summarization machine learning model on a storage subsystem associated with a document collaboration server computing device. For example, in some embodiments, the input size limit hyper-parameter for the T5 text summarization machine learning model is 512, such that the T5 text summarization machine learning model may during each processing iteration only process an input text having a size up to 512 tokens. As another example, in some embodiments, the input size limit hyper-parameter for a first variant of the pre-training with extracted gap-sentences (Pegasus) text summarization machine learning model is 512, such that the first variant of the Pegasus text summarization machine learning model may during each processing iteration only process an input text having a size up to 512 tokens. As yet another example, in some embodiments, the input size limit hyper-parameter for a second variant of the Pegasus text summarization machine learning model is 1024, such that the second variant of the Pegasus text summarization machine learning model may during each processing iteration only process an input text having a size up to 1024 tokens. As a further example, in some embodiments, the input size limit hyper-parameter for a third variant of the Pegasus text summarization machine learning model is 2048, such that the third variant of the Pegasus text summarization machine learning model may during each processing iteration only process an input text having a size up to 2048 tokens. The input size limit hyper-parameter of a text summarization machine learning model may be used to generate segments of a section and generate section input batches for the section based on the generated segments of the section. For example, if the text summarization machine learning model is a T5 which has an input size limit hyper-parameter of 512 tokens, and if a particular section comprises 1,000 tokens, then the first segment of that section may include the first 512 tokens of the section and the second segment of the section may include the last 488 tokens of the section. In this example, if the first 512 tokens of the section precede the second 488 tokens of the section, then the section input batch corresponding to the first 512 tokens are processed by the same text summarization machine learning model before the section input batch corresponding to the last 488 tokens.

At operation 702, the document collaboration server computing device 106 determines the segments of a selected section. In some embodiments, operation 702 includes the process of chunking each section based on the input size limit hyper-parameter of the text summarization machine learning model. For example, if the text summarization machine learning model is a T5 which has an input size limit hyper-parameter of 512 tokens, and if a particular section comprises 1,000 tokens, then the first segment of that section may include the first 512 tokens of the section and the second segment of the section may include the last 488 tokens of the section.

At operation 703, the document collaboration server computing device 106 determines the section input batches based on the segments determined at operation 702. In some embodiments, each segment determined at operation 702 is assigned to a section input batch. As discussed above, once generated, the section input batches are provided to the text summarization machine learning model in accordance with a batch processing operation sequence in order to generate a section summary for a corresponding section. In some embodiments, the section input batches are processed by the text summarization machine learning model based on the corresponding segment ordering within the corresponding document. For instance, in the exemplary 1000-token example described above, if the first 512 tokens of the section precede the second 488 tokens of the section, then the section input batch corresponding to the first 512 tokens may be processed by the same text summarization machine learning model before the section input batch corresponding to the last 488 tokens.

At operation 502, the document collaboration server computing device 106 performs a batch processing operation sequence by providing each section input batch to a text summarization machine learning model to generate a set of model outputs corresponding to the batch processing operation sequence. Each batch processing operation in the batch processing operation sequence may include processing a corresponding section input batch by the text summarization model to generate a model output for the batch processing operation in the batch processing operation sequence. In some embodiments, the section summary is determined based on at least one of the model outputs generated for the batch processing operation sequence, for example based on a final model output for a final batch processing operation in the batch processing operation sequence, or based on all of the model outputs generated for all of the batch processing operations in the particular batch processing operation sequence.

In some embodiments, a batch processing operation sequence is an ordered set of processing iterations of a text summarization machine learning model in relation to generating a section summary for a corresponding section of the multi-section document. The batch processing operation sequence may comprise one or more batch processing operations, where each batch processing operation may describe a processing iteration of the text summarization machine learning model in relation to the corresponding section and includes processing a section input batch associated with the batch processing operation using the text summarization machine learning model in order to generate the section summary for the corresponding section. The batch processing operation sequence may be generated by the document collaboration server computing device as configuration data for an inference performed by the text summarization machine learning model. In some embodiments, given a set of section ordered input batches whose ordering is determined based on the ordering of the corresponding segments of a selected section, the ordering of the batch processing operations in the batch processing operation sequence for the selected section is determined based on the ordering of the segments of the multi-section document.

For instance, if the segment X comes before the segment Y within a selected section, then the batch processing operations sequence will perform the batch processing operation for the segment X before the processing operation for the segment Y. In some embodiments, the order of the batch processing operation sequence may be based on ordering criteria defined by prior configuration data for the multi-section document, prior configuration data for the text summarization machine learning model, and/or configuration data provided by an end user of the document collaboration server computing device.

Figure 8:
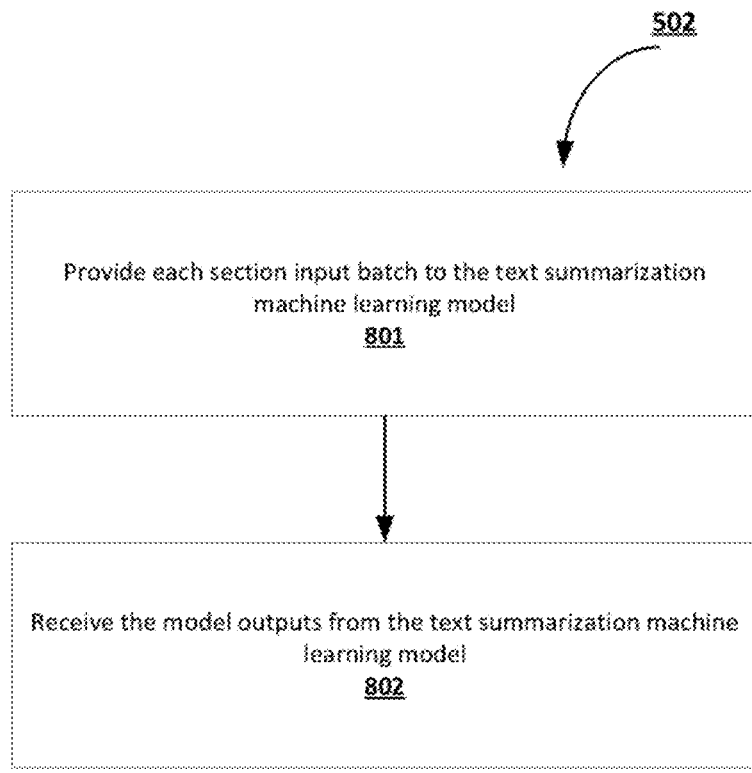
FIG. 8 is a flowchart diagram of an example process for performing a batch processing operation sequence for a section of a multi-section document by providing each section input batch for the section to a text summarization machine learning model to generate model outputs for the section in accordance with at least some embodiments of the present invention.

In some embodiments, operation 502 may be performed in accordance with the process that is depicted in FIG. 8. The process that is depicted in FIG. 8 begins at operation 801 when the document collaboration server computing device 106 provides each section input batch to the text summarization machine learning model. In some embodiments, each section input batch is separately inputted into a text summarization machine learning model based on the batch processing operation sequence, wherein each section input batch is processed by the text summarization machine learning model in the order in which it is found in the corresponding section. For example, given an ordered set of section input batches $\{IS_1, IS_2, IS_3\}$, $IS_1$ may be provided during a first batch processing operation, $IS_2$ may be provided during a second batch processing operation, and $IS_3$ may be provided during a third batch processing operation.

At operation 802, the document collaboration server computing device 106 determines the model outputs based on each batch processing operation in the batch processing operation sequence. In some embodiments, the model outputs are aggregated from the output of processing each section input batch by the text summarization machine learning model. In some embodiments, if a section is associated with multiple section input batches, then model outputs for each corresponding section input batch will be placed in the correct order as the order of the section input batches defined by the batch processing operation sequence (e.g., if section input batch A went before section input batch B into the text summarization machine learning model, then model output A that is associated with section input batch A will be placed before the model output B that is associated with section input batch B). After all the model outputs corresponding to each section input batch for a document have been produced, the model outputs may be aggregated to create a single model output.

In some embodiments, the batch processing operation sequence for the first section comprises one or more batch processing iterations for the first section, and wherein each batch processing iteration is performed in relation to a corresponding section input batch for the first section. In some embodiments, performing a first batch processing iteration comprises processing the corresponding section input batch for the first using the text summarization machine learning model in accordance with a context weight vector set for the first batch processing iteration. In some embodiments, each context weight vector in the context weight vector set for the first batch processing iteration describes, for each token of the first section, an attention weight for the token in relation to an input token associated with the context weight vector. In some embodiments, the batch processing operation sequence for the first section comprises one or more batch processing iterations for the first section, and wherein the one or more batch processing iterations are performed in accordance with a common context weight vector set for the first section.

In some embodiments, the text summarization machine learning model is an attention-based transformer text summarization machine learning model. In some embodiments, the attention-based transformer text summarization machine learning model comprises a text-to-text transfer transformer model. In some embodiments, the attention-based transformer text summarization machine learning model comprises a pre-training with extracted gap-sentences for abstractive summarization model.

An operational example of an attention-based transformer text summarization machine learning model 1200 is depicted in FIG. 12. As depicted in FIG. 12, the attention-based transformer text summarization machine learning model 1200 comprises a section segmentation layer 1201, where the section segmentation layer 1201 is configured to process a multi-section document 1211 in order to generate a batch processing operation sequence 1212 that includes section input segments 1213A-1213N. To do so, the section segmentation layer 1201 uses an input size limit hyperparameter 1214.

As further depicted in FIG. 12, the attention-based transformer text summarization machine learning model 1200 comprises an attention-based processing layer 1202, where the attention-based processing layer 1202 is configured to process batch processing operation sequence 1212 for the multi-section document 1211 during a set of processing iterations. In particular, the attention-based processing layer 1202 is configured to process, at each processing iteration, a section input segment in order to generate a model output, such as the model outputs 1215A-1215N which correspond to the section input segments 1213A-1213N. To do so, the attention-based processing layer 1202 uses a section-wide context weight vector 1216.

As further depicted in FIG. 12, the attention-based transformer text summarization machine learning model 1200 comprises an output aggregation layer 1203, where the output aggregation layer 1203 is configured to generate the section summary 1217 based on the model outputs generated by the attention-based processing layer 1202, such as the model outputs 1215A-1215N which correspond to the section input segments 1213A-1213N. To do so, the output aggregation layer 1203 uses an output aggregation model 1208 that describes guidelines for merging model outputs to generate the section summary 1217.

At operation 503, the document collaboration server computing device 106 generates the section summary based on the model outputs created by the text summarization machine learning model. As described above, the section summary may be generated based on at least one of the model outputs generated by the batch processing operation sequence. For example, in some embodiments, the section summary may be generated based on a final model output for a final batch processing operation in the batch processing operation sequence. As another example, in some embodiments, the section summary may be generated based on all of the model outputs generated for all of the batch processing operations in the batch processing operation sequence.

At operation 402, the document collaboration server computing device 106 generates the abstractive summary for the multi-section document based on each section summary for a section of the multi-section document. In some embodiments, operation 402 includes generating a section summary for each section within a multi-section document and then aggregating those section summaries to create an abstractive summary for the multi-section document.

At operation 403, the document collaboration server computing device 106 generates the abstractive summary user interface data on the client-side server device which describe the content data (e.g., text data) of the abstractive summary for the multi-section document. In some embodiments, the abstractive summary user interface data comprises data (e.g., HTML data) for a single document summarization user interface element that describes all of the abstractive summary. In some embodiments, the abstractive summary user interface data comprises data for a group of document summarization user interface elements, where each document summarization user interface element comprises data (e.g., HTML data) for a section summary of a section of the multi-section document that is associated with the document summarization user interface element.

At operation 404, the document collaboration server computing device 106 transmits the abstractive summary user interface data to the client computing device 102. After the abstractive summary user interface data is transmitted to the client computing device 102, the client computing device 102 uses the abstractive summary user interface data to generate one or more document summarization user interface elements based on the abstractive summary user interface data and presents the one or more document summarization user interface elements to an end user of the client computing device 102. As described above, in some embodiments, the one or more document summarization user interface elements comprise a single document summarization user interface element that describes all of the abstractive summary for a multi-section document; while in other embodiments, the one or more document summarization user interface elements comprises a document summarization user interface element for each section of a multi-section document that describes the section summary for the corresponding section of the multi-section document.

Exemplary Client-Side Operations

Figure 6:
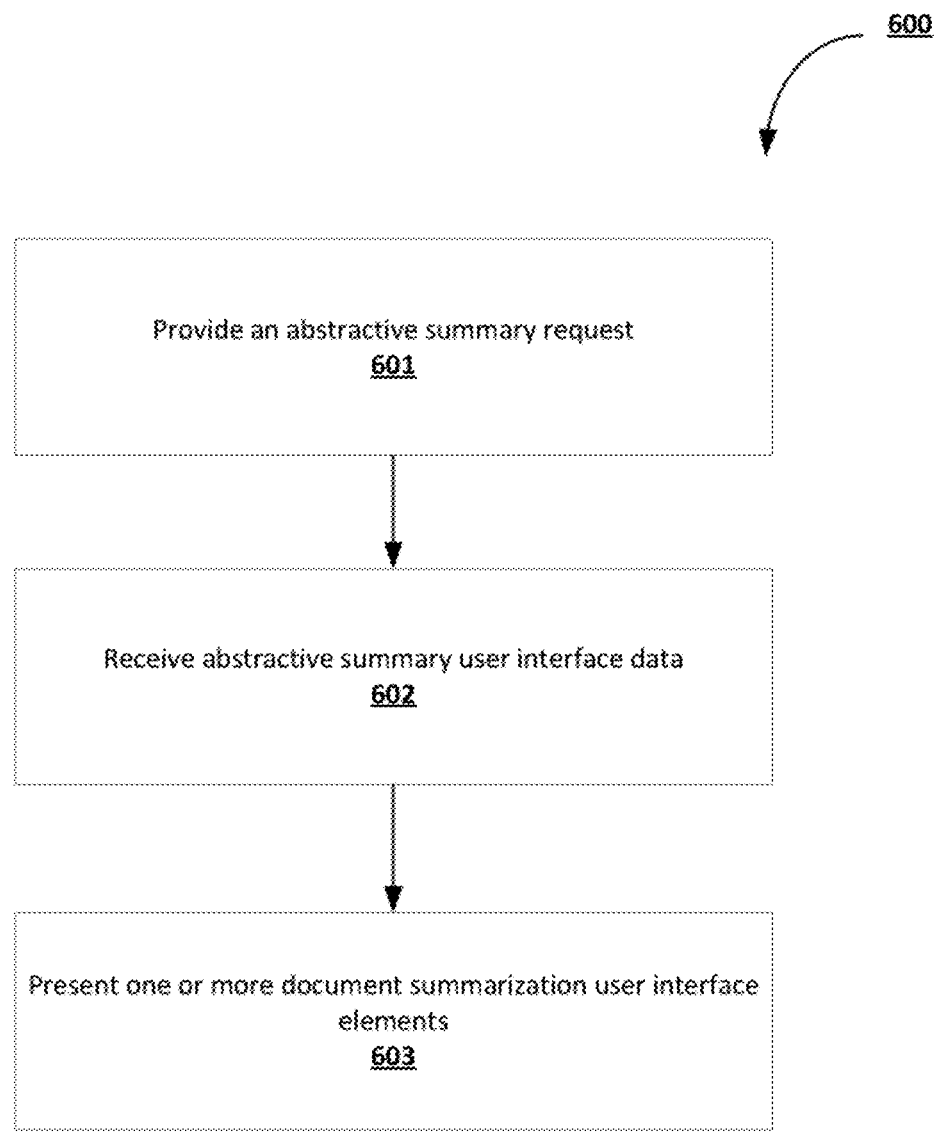
FIG. 6 is a flowchart diagram of an example process for performing client-side operations that are configured to present a set of document summarization user interface elements for a multi-section document to an end user of a client computing device in accordance with at least some embodiments of the present invention.

FIG. 6 is a flowchart diagram of an example process 600 for performing client-side operations that are configured to present a group of document summarization user interface elements to an end user of a client computing device 102. Via the various operations of the process 600, an exemplary client computing device 102 can present one or more document summarization user interface elements describing an efficiently-generated abstractive summary for a multi-section document to an end user of the client computing device 102.

The process 600 begins at operation 601 when the client computing device 102 provides an abstractive summary request to the document collaboration server computing device 106. The abstractive summary request may be a request for receiving abstractive summary user interface data describing the abstractive summary of a corresponding multi-section document. In some embodiments, an end user, after being presented a document through the document collaboration server system, may select an option within a graphical user interface (GUI) to "summarize" the document. Additionally, if the multi-section document is recently updated, the abstractive summary may be updated to show any changes or amendments to the document, if the end user selects an option to "refresh" the document summarization user interface element.

At operation 602, the client computing device 102 receives the abstractive summary user interface data. The abstractive summary user interface data may be generated by the document collaboration server computing device 106 through the operations described in relation to process 400 of FIG. 4. In some embodiments, the abstractive summary user interface data comprises data (e.g., HTML data) for a single document summarization user interface element that describes all of the abstractive summary. In some embodiments, the abstractive summary user interface data comprises data for a group of document summarization user interface elements, where each document summarization user interface element comprises data (e.g., HTML data) for a section summary of a section of the multi-section document that is associated with the document summarization user interface element.

At operation 603, the client computing device 102 presents one or more document summarization user interface elements that are generated based on the abstractive summary user interface data to an end user of the client computing device. As described above, in some embodiments, the one or more document summarization user interface elements comprise a single document summarization user interface element that describes all of the abstractive summary for a multi-section document; while in other embodiments, the one or more document summarization user interface elements comprises an document summarization user interface element for each section of a multi-section document that describes the section summary for the corresponding section.

FIGS. 9-10 provide an operational example of document summarization user interface elements that each include all of the abstractive summary for a corresponding multi-section document. In particular, the document summarization user interface 900 of FIG. 9 element describes each section summary for a section of the corresponding multi-section document, such as the section summary 901 for the first section of the corresponding multi-section document. Similarly, the document summarization user interface 1000 of FIG. 10 element describes each section summary for a section of the corresponding multi-section document, such as the section summary 1001 for the first section of the corresponding multi-section document.

FIG. 11 provides an operational examples of two document summarization user interface elements 1101-1102 that each include the section summary for a corresponding section of a multi-section document that is associated with the two document summarization user interface elements. In particular, the document summarization user interface element 1101 describes the section summary for the section 1111, while the user interface element 1102 describes the section summary for the section 1112.

Additional Implementation Details

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an limited interaction mode and/or a non-limited interaction mode for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language page), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending pages to and receiving pages from a device that is used by the user; for example, by sending web pages to a web browser on a user's query-initiating computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a query-initiating computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML, page) to a query-initiating computing device (e.g., for purposes of displaying information/data to and receiving user input from a user interacting with the query-initiating computing device). Information/data generated at the query-initiating computing device (e.g., a result of the user interaction) can be received from the query-initiating computing device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. An apparatus for generating an abstractive summary of a multi-section document comprising one or more sections, the apparatus comprising at least one processor and at least one memory including program code, the at least one memory and the program code configured to, with the processor, cause the apparatus to at least:
   for each section of the multi-section document, generate a section summary, wherein generating the section summary comprises:
      generating one or more section input batches for a selected section, wherein each section input batch comprises a segment of the selected section determined based on an input size limit hyper-parameter of a text summarization machine learning model, and
      generating the section summary for the selected section based on a model output generated by the text summarization machine learning model via performing a batch processing operation sequence for the selected section in relation to the one or more section input batches;
   generate the abstractive summary by aggregating each section summary for each section of the multi-section document; and
   store the abstractive summary in a storage location associated with the multi-section document, wherein the abstractive summary is configured to be used to generate abstractive summary user interface data for one or more document summarization user interface elements, and wherein the one or more document summarization user interface elements are collectively configured to depict, for each section of the multi-section document, a section heading for the section and the section summary for the section.

2. The apparatus of claim 1, wherein the batch processing operation sequence for the first section comprises one or more batch processing iterations for the first section, and wherein each batch processing iteration is performed in relation to a corresponding section input batch for the first section.

3. The apparatus of claim 2, wherein performing a first batch processing iteration comprises processing the corresponding section input batch for the first using the text summarization machine learning model in accordance with a context weight vector set for the first batch processing iteration.

4. The apparatus of claim 3, wherein each context weight vector in the context weight vector set for the first batch processing iteration describes, for each token of the first section, an attention weight for the token in relation to an input token associated with the context weight vector.

5. The apparatus of claim 1, wherein the batch processing operation sequence for the first section comprises one or more batch processing iterations for the first section, and wherein the one or more batch processing iterations are performed in accordance with a common context weight vector set for the first section.

6. The apparatus of claim 1, wherein the text summarization machine learning model is an attention-based transformer text summarization machine learning model.

7. The apparatus of claim 6, wherein the attention-based transformer text summarization machine learning model comprises a text-to-text transfer transformer model.

8. The apparatus of claim 6, wherein the attention-based transformer text summarization machine learning model comprises a pre-training with extracted gap-sentences for abstractive summarization model.

9. The apparatus of claim 1, wherein the one or more sections are determined based on a hierarchical segmentation of the multi-section document.

10. The apparatus of claim 9, wherein the hierarchical segmentation is a first-level hierarchical segmentation of the multi-section document.

11. A computer-implemented method for generating an abstractive summary of a multi-section document comprising one or more sections, the computer-implemented method comprising:
for each section of the multi-section document, generating a section summary, wherein generating the section summary comprises:
generating one or more section input batches for a selected section, wherein each section input batch comprises a segment of the selected section determined based on an input size limit hyper-parameter of a text summarization machine learning model, and
generating the section summary for the selected section based on a model output generated by the text summarization machine learning model via performing a batch processing operation sequence for the selected section in relation to the one or more section input batches;
generating the abstractive summary by aggregating each section summary for each section of the multi-section document; and
storing the abstractive summary in a storage location associated with the multi-section document, wherein the abstractive summary is configured to be used to generate abstractive summary user interface data for one or more document summarization user interface elements, and wherein the one or more document summarization user interface elements are collectively configured to depict, for each section of the multi-section document, a section heading for the section and the section summary for the section.

12. The computer-implemented method of claim 11, wherein the batch processing operation sequence for the first section comprises one or more batch processing iterations for the first section, and wherein each batch processing iteration is performed in relation to a corresponding section input batch for the first section.

13. The computer-implemented method of claim 12, wherein performing a first batch processing iteration comprises processing the corresponding section input batch for the first using the text summarization machine learning model in accordance with a context weight vector set for the first batch processing iteration.

14. The computer-implemented method of claim 13, wherein each context weight vector in the context weight vector set for the first batch processing iteration describes, for each token of the first section, an attention weight for the token in relation to an input token associated with the context weight vector.

15. The computer-implemented method of claim 11, wherein the batch processing operation sequence for the first section comprises one or more batch processing iterations for the first section, and wherein the one or more batch processing iterations are performed in accordance with a common context weight vector set for the first section.

16. The computer-implemented method of claim 11, wherein the text summarization machine learning model is an attention-based transformer text summarization machine learning model.

17. The computer-implemented method of claim 16, wherein the attention-based transformer text summarization machine learning model comprises a text-to-text transfer transformer model.

18. The computer-implemented method of claim 16, wherein the attention-based transformer text summarization machine learning model comprises a pre-training with extracted gap-sentences for abstractive summarization model.

19. The computer-implemented method of claim 11, wherein the one or more sections are determined based on a hierarchical segmentation of the multi-section document.

20. A computer program product for generating an abstractive summary of a multi-section document comprising one or more sections, the computer program product comprising at least one non-transitory computer-readable storage medium having computer-readable program code portions stored therein, the computer-readable program code portions configured to:
for each section of the multi-section document, generate a section summary, wherein generating the section summary comprises:
generating one or more section input batches for a selected section, wherein each section input batch comprises a segment of the selected section determined based on an input size limit hyper-parameter of a text summarization machine learning model, and
generating the section summary for the selected section based on a model output generated by the text summarization machine learning model via performing a batch processing operation sequence for the selected section in relation to the one or more section input batches;
generate the abstractive summary by aggregating each section summary for each section of the multi-section document; and
store the abstractive summary in a storage location associated with the multi-section document, wherein the abstractive summary is configured to be used to generate abstractive summary user interface data for one or more document summarization user interface elements, and wherein the one or more document summarization user interface elements are collectively configured to depict, for each section of the multi-section document, a section heading for the section and the section summary for the section.

* * * * *